(12) United States Patent
Kikuchi et al.

(10) Patent No.: US 7,791,247 B2
(45) Date of Patent: Sep. 7, 2010

(54) DRIVING APPARATUS (75) Inventors: Norihiko Kikuchi, Kanagawa (JP); Nobuyuki Hirose, Tokyo (JP)

(73) Assignee: Panasonic Corporation, Osaka (JP)

( * ) Notice: Subject to any disclaimer, the term of this patent is extended or adjusted under 35 U.S.C. 154(b) by 180 days.

(21) Appl. No.: 11/719,497

(22) PCT Filed: Jul. 20, 2006

(86) PCT No.: PCT/JP2006/314392

§ 371 (c)(1),
(2), (4) Date: May 16, 2007

(87) PCT Pub. No.: WO2007/013349

PCT Pub. Date: Feb. 1, 2007

(65) Prior Publication Data
US 2009/0146602 A1 Jun. 11, 2009

(30) Foreign Application Priority Data
Jul. 28, 2005 (JP) .............................. 2005-218948

(51) Int. Cl.
H01L 41/00 (2006.01)
(52) U.S. Cl. ..................... 310/311; 318/127; 318/265
(58) Field of Classification Search ................. 318/129, 318/127, 265, 280, 282, 286, 560; 310/311, 310/316.01, 316.02; 396/52
See application file for complete search history.

(56) References Cited

U.S. PATENT DOCUMENTS 4,689,514 A * 8/1987 Kondoh et al. ......... 310/323.21
4,799,078 A * 1/1989 Hayama ....................... 396/61
5,589,723 A * 12/1996 Yoshida et al. ............. 310/328

(Continued)

FOREIGN PATENT DOCUMENTS

JP 04-069070 A 4/1992

(Continued)

OTHER PUBLICATIONS

International Search Report, dated Aug. 28, 2006.

*Primary Examiner*—Walter Benson
*Assistant Examiner*—Antony M Paul
(74) *Attorney, Agent, or Firm*—Pearne & Gordon LLP (57) ABSTRACT

An automatic focus camera Unit 10, comprises; a piezoelectric element 13a; a driving shaft 13b to be driven by the piezoelectric element 13a; a moving unit 13c to be moved with respect to the driving shaft 13b by a friction force caused by the driving shaft 13b; a microcomputer unit 24 for controlling power supply to the piezoelectric element 13a, and in which the microcomputer unit 24 assumes a preprocessing mode of calculating an amount of adjustment for a power supply time in accordance with a moving direction of the moving unit 13c, and a movement controlling mode of adjusting the supply time and controlling power supply based on the moving direction and the amount of adjustment. In the preprocessing mode, the moving unit 13c is controlled based on the detecting result of the base end sensor 15 and moved in forward and backward directions using the base end position 15a as a reference point, and the amount of adjustment is calculated based on the supply time for which power is supplied while the moving unit 13c is moved in the forward direction and the supply time for which power is supplied while the moving unit 13c is moved in backward direction.

4 Claims, 9 Drawing Sheets

U.S. PATENT DOCUMENTS

| | | | |
|---|---|---|---|
| 5,634,171 A * | 5/1997 | Muto | 399/32 |
| 5,721,581 A * | 2/1998 | Saito et al. | 347/249 |
| 5,850,575 A * | 12/1998 | Ohishi | 396/52 |
| 6,104,122 A * | 8/2000 | Ishimaru | 310/323.02 |
| 6,249,093 B1 * | 6/2001 | Takahata et al. | 318/129 |
| 6,288,475 B1 * | 9/2001 | Ito et al. | 310/323.01 |
| 6,512,321 B2 * | 1/2003 | Yoshida et al. | 310/316.01 |
| 6,707,231 B2 * | 3/2004 | Pease et al. | 310/317 |
| 6,717,329 B2 * | 4/2004 | Yoshida et al. | 310/316.02 |
| 6,836,057 B2 * | 12/2004 | Hata | 310/328 |
| 6,856,345 B1 * | 2/2005 | Yamamoto et al. | 348/207.2 |
| 7,190,104 B2 * | 3/2007 | Yuasa | 310/317 |

FOREIGN PATENT DOCUMENTS

| | | |
|---|---|---|
| JP | 8-149860 A | 6/1996 |
| JP | 2004-56878 A | 2/2004 |

* cited by examiner

DRIVING APPARATUS

TECHNICAL FIELD OF THE INVENTION

The present invention relates to a driving apparatus comprising a piezoelectric element.

DESCRIPTION OF THE RELATED ART

In recent years, there have been widely used small-sized digital camera units each having an automatic focus function of automatically detecting a focal point of imaging lens. As a device for driving the lens, there is known a conventional driving apparatus comprising a piezoelectric element, a driving shaft to be driven by the piezoelectric element, and a moving unit for supporting the lens, to have the lens moved by a friction force generated between the driving shaft and the moving unit (see, for example, patent documents 1 and 2).

In general, piezoelectric elements are different from one another in the amounts of elongation and contraction. This leads to the fact that the conventional driving apparatuses are inherently different from one another in the moving amount of the moving unit in each of moving directions due to individual variability of each of constituent elements, in particular, the piezoelectric elements. In addition, the conventional driving apparatus, a frictional force generated between the driving shaft and the moving unit varies in accordance with change of its own position and/or posture. This leads to the fact that the conventional driving apparatus may vary in the moving amount of the moving unit in each of moving directions due to the change of its own position and/or posture. Further, the conventional driving apparatus may vary in the moving amount of the moving unit in each of moving directions due to the change of environment such as, for example, temperature, humidity, and the like. Accordingly, the conventional driving apparatus is required to include an accurate position detecting unit such as, for example, an encoder, to sequentially detect an actual position of the moving unit, and to feedback-control the operation of the moving unit based on the detecting result of the position detecting unit, to realize a positioning of the moving unit with high accuracy.

Patent Document 1: Japanese Patent Laid-Open Publication No. H04-69070

Patent Document 2: Japanese Patent Laid-Open Publication No. H08-149860

DISCLOSURE OF THE INVENTION

Problems to be Solved

The conventional driving apparatus, however, encounters a drawback in that the number of complete parts is increased, and it is thus difficult for the conventional driving apparatus to be reduced in size and weight.

The present invention is made to solve the foregoing problem, and it is therefore an object of the present invention to provide a driving apparatus which can be reduced in the number of complete parts in comparison with the conventional driving apparatus.

Means of Solving the Problems

In accordance with a first aspect of the present invention, there is provided a driving apparatus, comprising: a piezoelectric element; a driving unit to be driven by said piezoelectric element; a moving unit to be moved with respect to said driving unit by a friction force caused by said driving unit; predetermined position detecting means for detecting that said moving unit is placed at a predetermined position; and supply controlling means for controlling power supply to said piezoelectric element, and in which said supply controlling means assumes a plurality of operation modes including a preprocessing mode of controlling power supply to said piezoelectric element to have said moving unit moved forwardly and backwardly based on said predetermined position detected by said predetermined position detecting means, and a movement controlling mode of adjusting a supply time for which said power is supplied to said piezoelectric element and controlling power supply to said piezoelectric element to have said moving unit moved, based on a supply time for which said power is supplied to said piezoelectric element while said moving unit is moved forwardly, a supply time for which said power is supplied to said piezoelectric element while said moving unit is moved backwardly, and a moving direction of said moving unit.

The driving apparatus according to the present invention thus constructed can be reduced in the number of complete parts in comparison with the conventional driving apparatus, resulting from the fact that the need of an accurate position detecting unit such as, for example, an encoder for sequentially detecting an actual position of the moving unit is eliminated.

Further, in the driving apparatus according to the present invention, said supply controlling means may calculate an amount of adjustment for said supply time in accordance with said moving direction based on said supply time for which said power is supplied to said piezoelectric element while said moving unit is moved forwardly and said supply time for which said power is supplied to said piezoelectric element while said moving unit is moved backwardly on said preprocessing mode, and to adjust said supply time and control power supply, based on said moving direction and said amount of adjustment on said movement controlling mode.

The driving apparatus according to the present invention thus constructed can be reduced in the number of complete parts in comparison with the conventional driving apparatus, resulting from the fact that the need of an accurate position detecting unit such as, for example, an encoder for sequentially detecting an actual position of the moving unit is eliminated.

Further, the driving apparatus according to the present invention may further comprise second position detecting means for detecting that said moving unit is placed at a second position spaced apart from said predetermined position at a predetermined distance, and in which said supply controlling means may control power supply to have said moving unit moved forwardly and backwardly between said predetermined position and said second position based on a result of said predetermined position detecting means and a result of said second position detecting means on said preprocessing mode.

The driving apparatus according to the present invention thus constructed can position the moving unit with higher accuracy because of the fact that the moving speed of the moving unit can be calculated.

Further, in the driving apparatus according to the present invention, said supply controlling means may adjust said supply time and control power supply based on said supply time for which said power is supplied to said piezoelectric element while said moving unit is moved forwardly, said supply time for which said power is supplied to said piezoelectric element while said moving unit is moved backwardly, said predetermined distance, and said moving direction on said movement controlling mode.

The driving apparatus according to the present invention thus constructed can position the moving unit with higher accuracy because of the fact that the moving speed of the moving unit can be calculated.

In accordance with a second aspect of the present invention, there is provided an imaging apparatus comprising the aforementioned driving apparatus and a lens supported by said moving unit.

The imaging apparatus according to the present invention thus constructed can be reduced in the number of complete parts in comparison with the conventional driving apparatus, resulting from the fact that the need of an accurate position detecting unit such as, for example, an encoder for sequentially detecting an actual position of the moving unit is eliminated.

EFFECT OF THE INVENTION

In accordance with the present invention, there is provided a driving apparatus which can be reduced in the number of complete parts in comparison with the conventional driving apparatus.

EXPLANATION OF THE REFERENCE NUMERALS 10 automatic focus camera unit (imaging apparatus)
11 focus lens
13a piezoelectric element
13b driving shaft (driving unit)
13c moving unit
15 base end sensor (predetermined position detecting means)
15a base end position (predetermined position)
16 leading end sensor (second position detecting means)
16a leading end position (second position)
24 microcomputer unit (supply controlling means)
30 driving apparatus
L predetermined distance
R forward and backward time ratio (amount of adjustment)
R1 moving speed
R2 moving speed

DESCRIPTION OF THE PREFERRED EMBODIMENTS

The following description will be directed to a plurality of preferred embodiments according to the present invention with reference to the drawings.

First Preferred Embodiment

The construction of a first preferred embodiment of an imaging apparatus according to the present invention will be described hereinlater.

Figure 1:
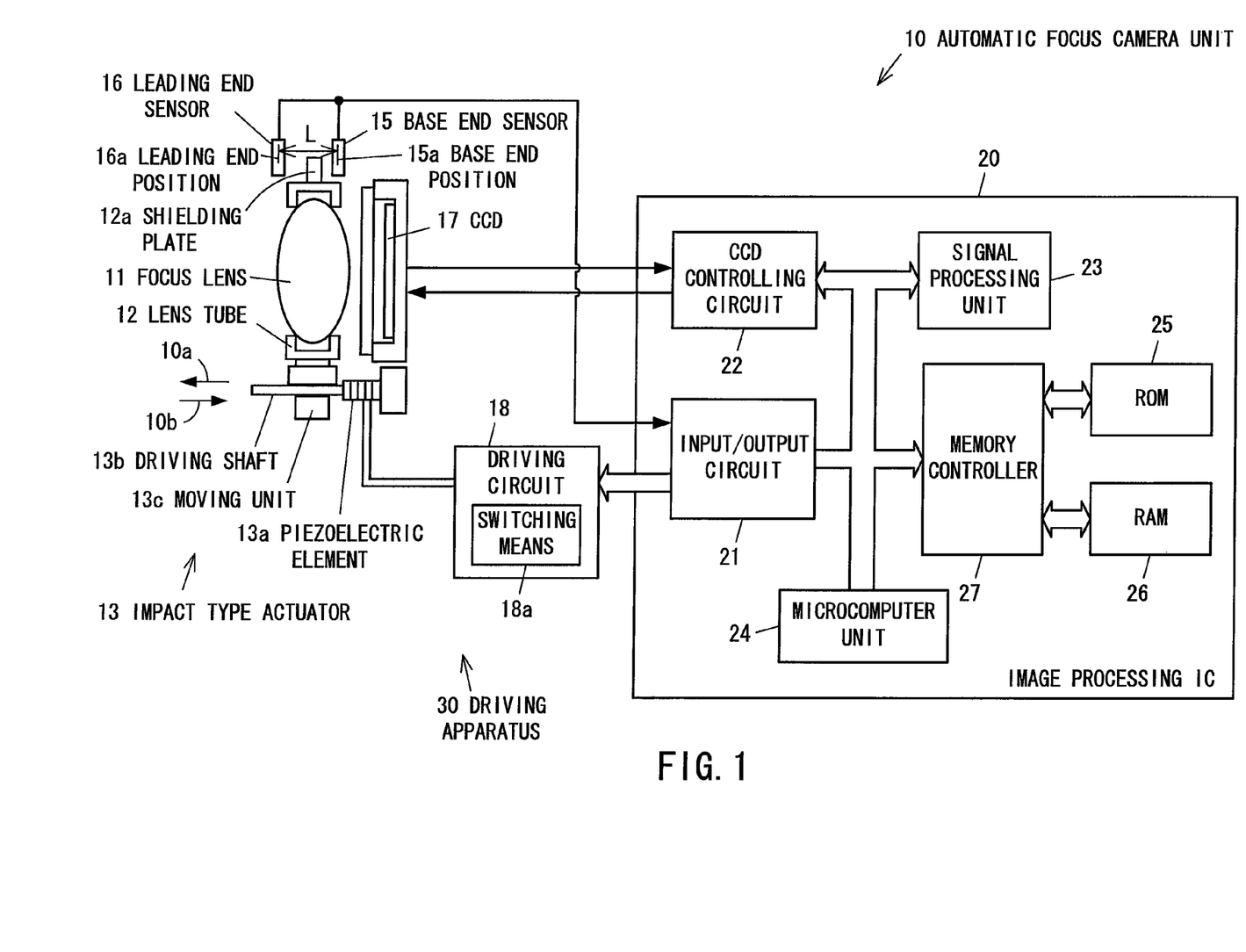
FIG. 1 is a block diagram showing a first preferred embodiment of an automatic focus camera unit according to the present invention.

As clearly shown in FIG. 1, the present embodiment of the imaging apparatus according to the present invention constituted by an automatic focus camera unit 10 comprises a focus lens 11, a lens tube 12 including a shielding plate 12a for shielding against a light, an impact type actuator 13 for driving the lens tube 12 in directions shown by arrows 10a and 10b extending in parallel with an optical axis of the focus lens 11, a base end sensor 15 constituted by a photo interrupter disposed at a base end position 15a within a moving range of the shielding plate 12a and designed to detect that the shielding plate 12a is placed at the base end position 15a when the light is shielded by the shielding plate 12a, a leading end sensor 16 constituted by a photo interrupter disposed at a leading end position 16a within a moving range of the shielding plate 12a and designed to detect that the shielding plate 12a is placed at the leading end position 16a when the light is shielded by the shielding plate 12a, a CCD (Charge Coupled Device) 17 for converting an image focused by the focus lens 11 into a video signal, a driving circuit 18 for supplying power to the impact type actuator 13, and an image processing IC (Integrated Circuit) 20 for carrying out an image processing on the video signal outputted from the CCD 17.

The automatic focus camera unit 10 further comprises switching means 18a. If the switching means 18a switches to a control unit time adjustment operation of a microcomputer unit 24 which will be described later, a control unit time is adjusted by the microcomputer unit 24 when a moving unit 13c, which will be described later, is moved in a direction shown by an arrow 10a and when the moving unit 13c is moved in a direction shown by an arrow 10b. When, on the other hand, the switching means 18a switches to a non-control unit time adjustment operation of the microcomputer unit 24, the control unit time is not adjusted by the microcomputer when the moving unit 13c is moved in a direction shown by the arrow 10a and when the moving unit 13c is moved in a direction shown by an arrow 10b. Though it has been described in the present embodiment that the switching means 18a is included in the driving circuit 18 for the purpose of simplifying the description, this does not limit the present invention. It is needless to mention that the switching means 18a may be disposed, for example, separately from the driving circuit 18.

The impact type actuator 13 includes a piezoelectric element 13a adapted to be elongated in the direction shown by the arrow 10a and contracted in the direction shown by the arrow 10b opposite to the direction shown by the arrow 10a, a driving shaft 13b coupled with the piezoelectric element 13a and to be driven by the piezoelectric element 13a selectively in the directions respectively shown by the arrow 10a and the arrow 10b, and the moving unit 13c fixedly connected with the lens tube 12 and held in frictional contact with the driving shaft 13b to be movable selectively in the directions shown by arrow 10a and the arrow 10b with respect to the driving shaft 13b.

The base end sensor 15 constitutes predetermined position detecting means for detecting that the moving unit 13c is placed at a predetermined position, viz., the base end position 15a. The leading end sensor 16 constitutes second position detecting means for detecting that the moving unit 13c is placed at a second position, viz., the leading end position 16a spaced apart from the base end position 15a at a predetermined distance L (several hundreds micrometers to several millimeters).

The image processing IC 20 includes an input/output circuit 21 for inputting signals from the base end sensor 15 and the leading end sensor 16, and outputting signals to the driving circuit 18, a CCD controlling circuit 22 for controlling the CCD 17, a signal processing unit 23 for obtaining a focal evaluation value based on high frequency components of the video signal outputted from the CCD 17, a microcomputer unit 24 for controlling the input/output circuit 21 based on the focal evaluation value obtained by the signal processing unit 23 to carry out an automatic focusing operation in a video contrast way, ROM (Read Only Memory) 25 for having stored therein, for example, operation programs to be executed by the microcomputer unit 24, a RAM (Random Access Memory) 26 for providing work areas with the microcomputer unit 24, and a memory controller 27 for controlling the ROM 25 and the RAM 26.

The microcomputer unit 24 is adapted to input signals from the base end sensor 15 and the leading end sensor 16 at time intervals of control unit time Bc.

The microcomputer unit 24 is designed to control power supply from the driving circuit 18 to the piezoelectric element 13a, and constitutes supply controlling means. In the case that voltage is applied by the driving circuit 18 to the piezoelectric element 13a, the microcomputer unit 24 is adapted to control the driving circuit 18 so that a supply time for which the voltage is applied to the piezoelectric element 13a becomes equal to an integral multiple of the control unit time.

Figure 2:
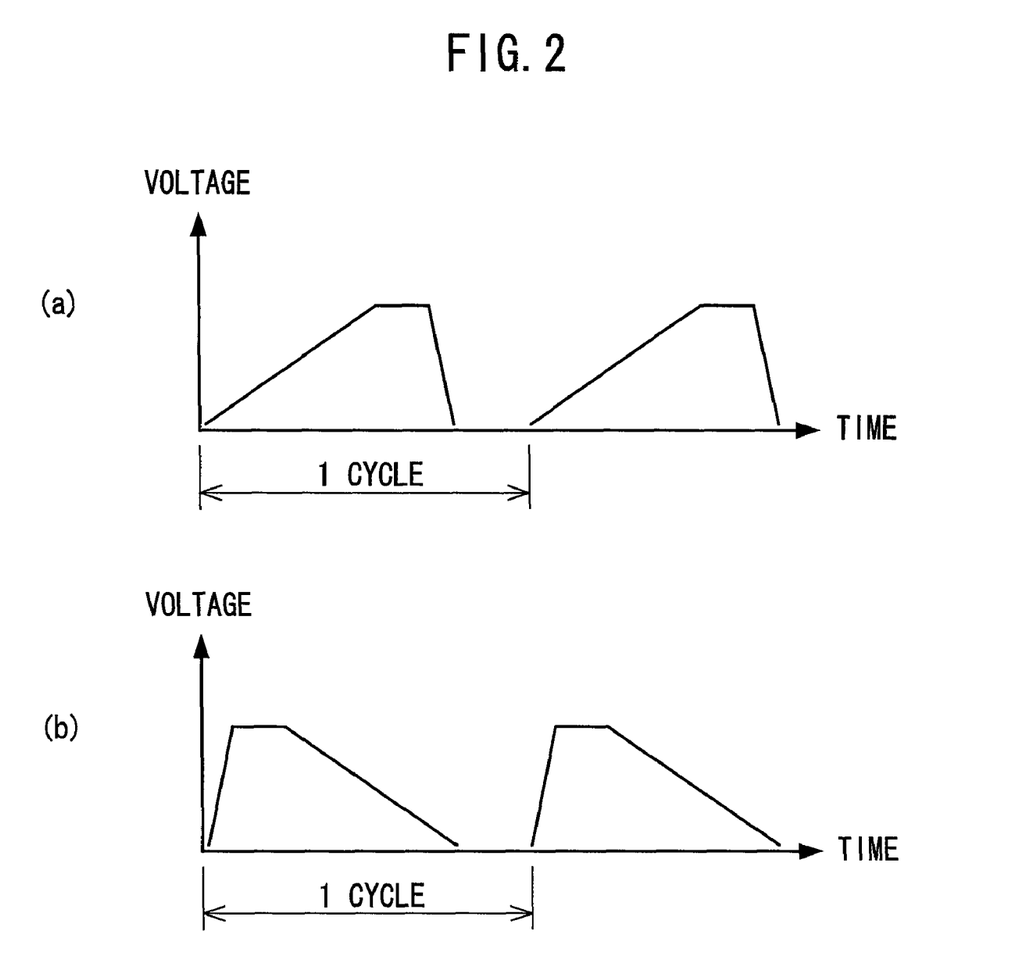
FIG. 2(a) is a graph showing voltage applied to the piezoelectric element when the focus lens is moved in the forward direction of the automatic focus camera unit shown in FIG. 1.
FIG. 2(b) is a graph showing voltage applied to the piezoelectric element when the focus lens is moved in the backward direction of the automatic focus camera unit shown in FIG. 1.

The ROM 25 is designed to have stored therein a signal shown in FIG. 2(a) used to move the moving unit 13c in a forward direction of the focus lens 11, i.e., the direction shown by the arrow 10a and a signal shown in FIG. 2(b) used to move the moving unit 13c in a backward direction of the focus lens 11, i.e., the direction shown by the arrow 10b, as signals used to determine signal wave forms of the voltages applied by the driving circuit 18 to the piezoelectric element 13a, viz., signals used to determine a speed of elongation and contraction and a drive frequency of the piezoelectric element 13a. It is to be noted that the signals shown in FIG. 2 are calculated and set on the basis of inertia masses of, for example, the focus lens 11, the lens tube 12, and the moving unit 13c, loads of, for example, dynamic and static friction forces generated between the driving shaft 13b and the moving unit 13c, a thrust force of the piezoelectric element 13a and a moving speed of the moving unit 13c to ensure that the automatic focus camera unit 10 is reliably operated. It is further to be noted that a cycle of the signal shown in FIG. 2(a) and a cycle of the signal shown in FIG. 2(b) are equal to each other.

The lens tube 12, the impact type actuator 13, the base end sensor 15, the leading end sensor 16, the driving circuit 18, the input/output circuit 21, the microcomputer unit 24, the ROM 25, the RAM 26, and the memory controller 27 constitute a driving apparatus 30 for driving the focus lens 11.

The operation of the automatic focus camera unit 10 will be described hereinlater.

The description hereinlater will be directed to the operation carried out by the microcomputer unit 24 to move the moving unit 13c.

Figure 3:
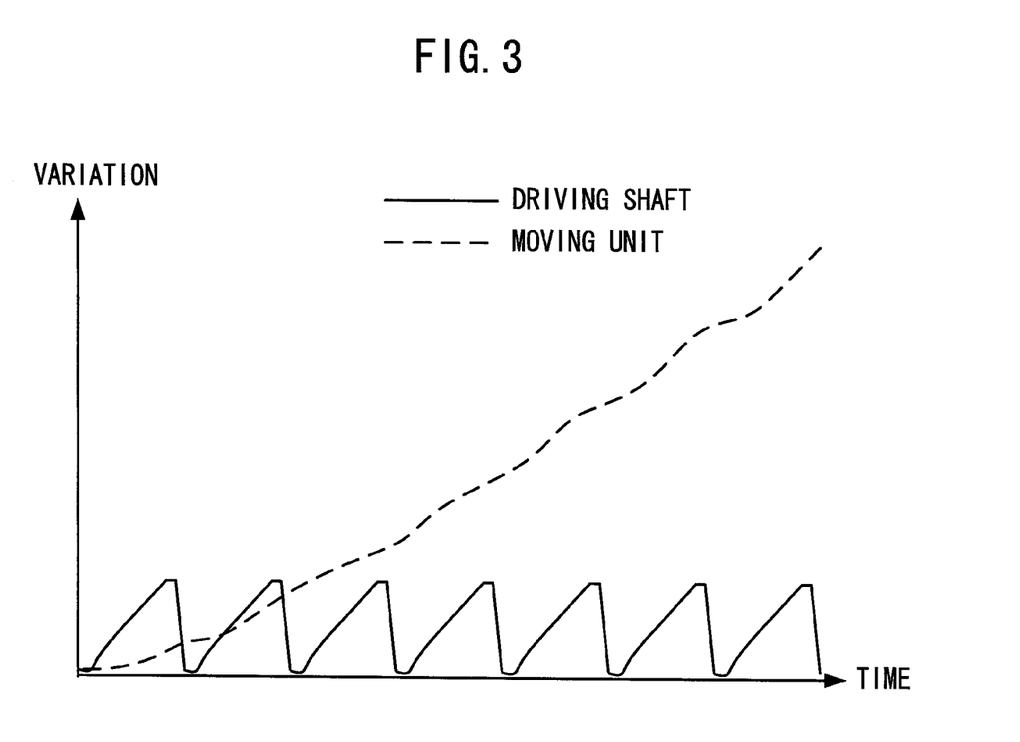
FIG. 3 is a graph showing variation of a driving shaft and a moving unit along supply time for which power is supplied to the piezoelectric element of the automatic focus camera unit shown in FIG. 1.

When a voltage as shown in FIG. 2(a) is applied by the driving circuit 18 to the piezoelectric element 13a in response to an instruction from the microcomputer unit 24, the piezoelectric element 13a is repeatedly elongated and contracted in accordance the voltage applied thereto, and the driving shaft 13b coupled with the piezoelectric element 13a is thus moved in accordance with the voltage as shown in FIG. 3. This means that the driving shaft 13b is slowly moved in the forward direction shown by the arrow 10a in accordance with the elongation of the piezoelectric element 13a while the voltage applied by the driving circuit 18 to the piezoelectric element 13a is slowly increased. The driving shaft 13b is, on the other hand, rapidly moved in the backward direction shown by the arrow 10b in accordance with the contraction of the piezoelectric element 13a while the voltage applied by the driving circuit 18 to the piezoelectric element 13a is rapidly decreased.

As the driving shaft 13b is moved as shown in FIG. 3, the moving unit 13c held in frictional contact with the driving shaft 13b is moved as shown in FIG. 3. This means that the moving unit 13c is slowly moved in the forward direction shown by the arrow 10a while the driving shaft 13b is slowly moved in the forward direction shown by the arrow 10a because of the fact that the frictional force generated between the moving unit 13c and the driving shaft 13b is greater than its inertia force. The moving unit 13c, on the other hand, is not moved while the driving shaft 13b is rapidly moved in the backward direction shown by the arrow 10b because of the fact that the frictional force generated between the moving unit 13c and the driving shaft 13b gets balanced out with its inertia force.

Accordingly, the moving unit 13c is slowly moved in the forward direction shown by the arrow 10a as shown in FIG. 3 if the voltage as shown in FIG. 2(a) is applied by the driving circuit 18 to the piezoelectric element 13a.

Though it has been described in the above about the case that the moving unit 13c is moved in the forward direction shown by the arrow 10a, it is needless to mention that the moving unit 13c is moved in the backward direction shown by the arrow 10b in the similar manner if the voltage as shown in FIG. 2(b) is applied by the driving circuit 18 to the piezoelectric element 13a.

A travel distance traveled by the moving unit 13c in response the voltage applied to the piezoelectric element 13a for one cycle is approximately several ten nanometers while, on the other hand, a minimum travel distance of the focus lens 11 required for implementing an automatic focus function of the automatic focus camera unit 10 may be in the range of 1 to 10 micrometers. It takes several cycles until the travel distance of the moving unit 13c becomes substantially in proportion to a driving time, in the sense of an extremely short time period immediately after the start of the movement, as shown in FIG. 3. In fact, the travel distance of the moving unit 13c can be regarded as being substantially in proportion to the actual driving time. This means that the travel distance of the moving unit 13c is controlled in accordance with a supply time (time period equal to an integral multiple of the control unit time) for which the power is supplied to the piezoelectric element 13a. It is to be noted that the control unit time Bc is set to be a short time to the degree that the moving unit 13c can be moved with a predetermined stopping accuracy.

Figure 4:
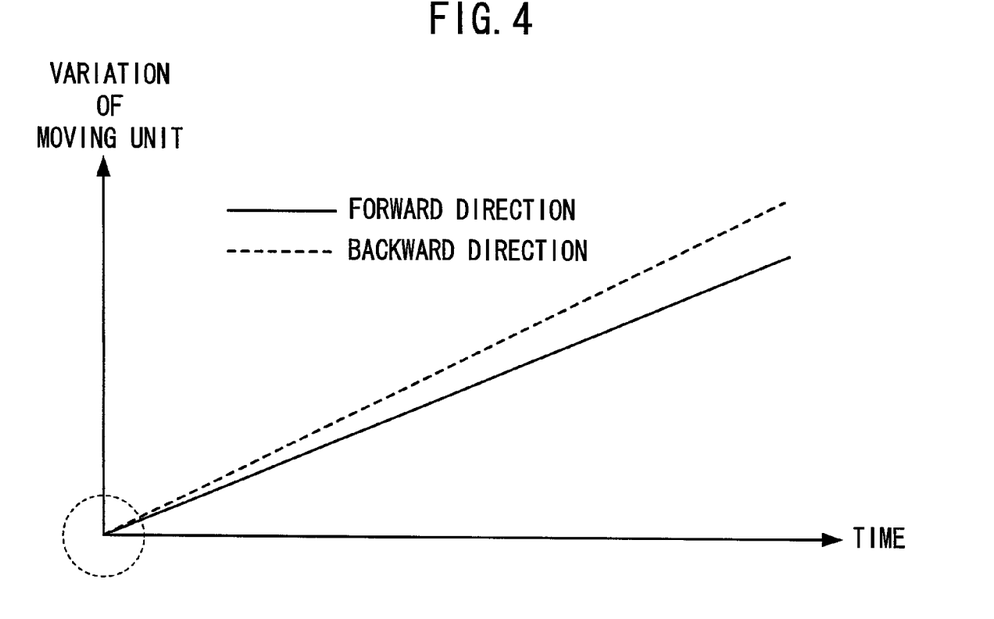
FIG. 4 is a graph showing variations of the moving unit respectively in forward and backward directions along supply time for which power is supplied to the piezoelectric element of the automatic focus camera unit shown in FIG. 1.

The travel distance traveled by the moving unit 13c while the moving unit 13c is moved in the forward direction shown by the arrow 10a may be different from and the travel distance traveled by the moving unit 13c while the moving unit 13c is moved in the backward direction shown by the arrow 10b, although the voltage applied to the piezoelectric element 13a remains constant. In the case that the forward direction shown by the arrow 10a of the automatic focus camera unit 10 is facing, for example, vertically upwardly, the moving unit 13c is moved in the forward direction shown by the arrow 10a less in travel distance illustrated as a full line in FIG. 4 in comparison with the posture that the moving unit 13c is moved in a direction substantially perpendicular to the direction along which the gravity is imparted thereto because of the fact that the moving unit 13c is exposed to gravity imparted thereto toward a direction opposite to the moving direction while, on the other hand, the moving unit 13c is moved in the backward direction shown by the arrow 10b larger in travel distance illustrated as a dotted line in FIG. 4 in comparison with the posture that the moving unit 13c is moved in a direction substantially perpendicular to the direction along which the gravity is imparted thereto because of the fact that the moving unit 13c is exposed to gravity imparted thereto toward to the moving direction.

The description hereinlater will be directed to the operation carried out by the microcomputer unit 24 upon receiving an instruction of starting an automatic focus function. The microcomputer unit 24 is designed to assume a preprocessing mode of controlling power supply to the piezoelectric element 13a to have the moving unit 13c moved forwardly and backwardly based on the base end position 15a detected by the base end sensor 15, and a movement controlling mode of adjusting a supply time for which the power is supplied to the piezoelectric element 13a and controlling power supply to the piezoelectric element 13a to have the moving unit 13c moved, based on a supply time for which the power is supplied to the piezoelectric element 13a while the moving unit is moved forwardly, a supply time for which the power is supplied to the piezoelectric element 13a while the moving unit is moved backwardly, and a moving direction of the moving unit 13c.

Figure 5:
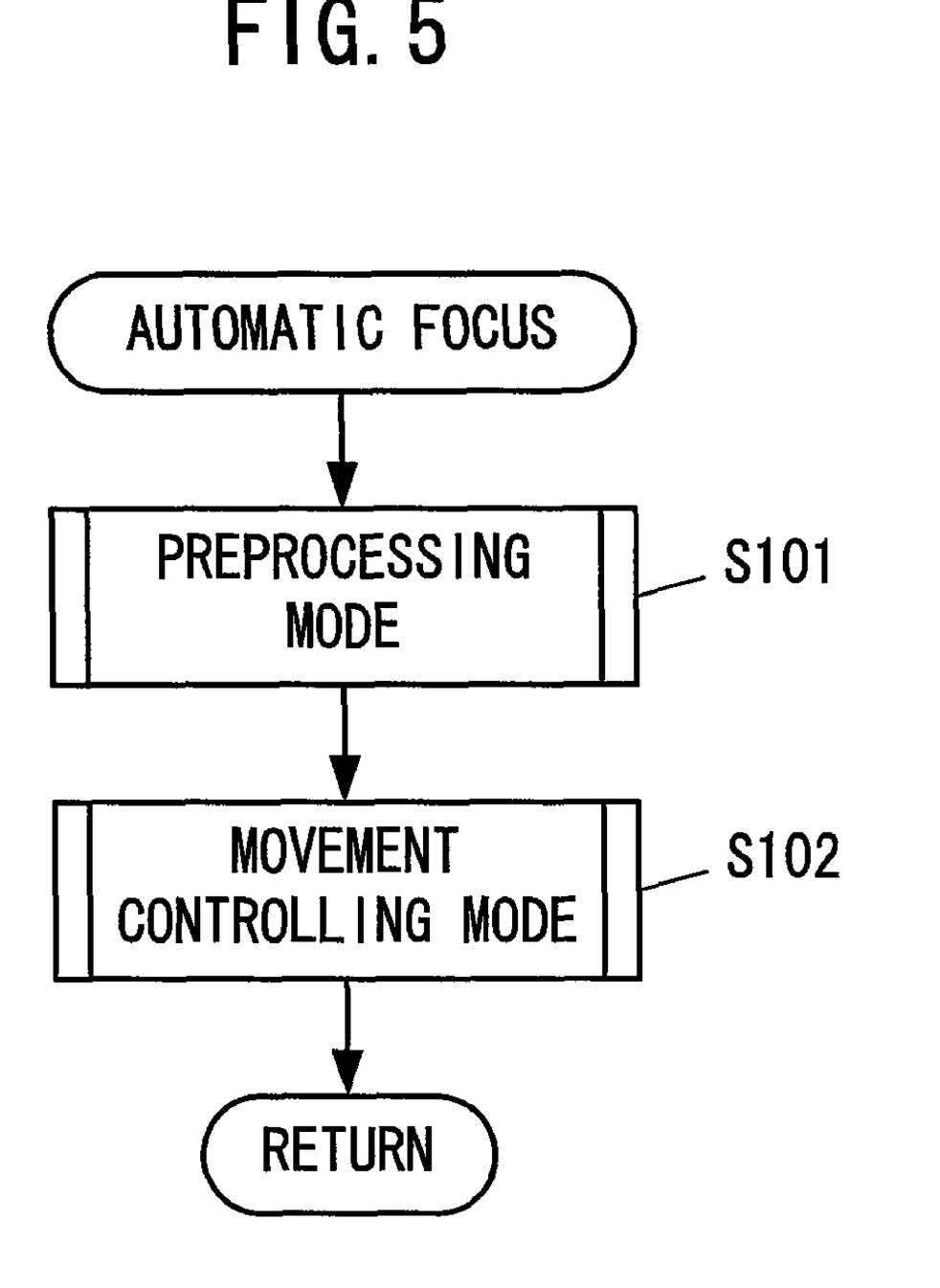
FIG. 5 is a flowchart showing processes carried out by the automatic focus camera unit shown in FIG. 1 executing an automatic focus function.
Figure 6:
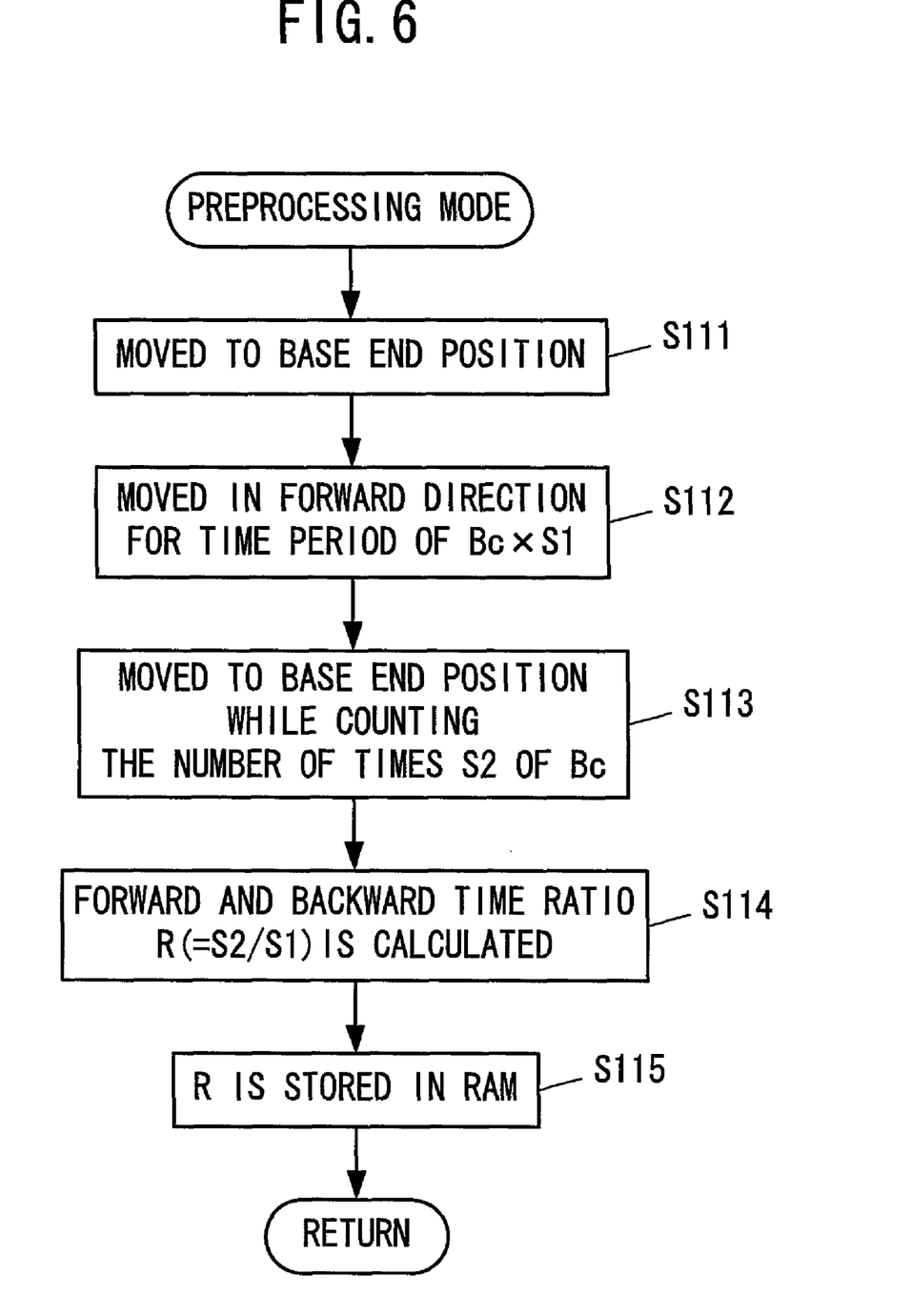
FIG. 6 is a flowchart showing processes in a preprocessing mode of the processes shown in FIG. 5.

As shown in FIG. 5, the microcomputer unit 24 is operated to start the preprocessing mode upon receiving the instruction of starting the automatic focus function, to calculate an amount of adjustment based on the supply time for which the power is supplied to the piezoelectric element 13a and the moving direction of the moving unit 13c (step S101). This means that, as shown in FIG. 6, the microcomputer unit 24 is operated to move the focus lens 11 to the base end position 15a based on a signal from the base end sensor 15 (step S111), and move the focus lens 11 from the base end position 15a toward the forward direction shown by the arrow 10a for a time period equal to S1 times as long as the control unit time Bc (step S112). Then, the microcomputer unit 24 is operated to move the focus lens 11 in the backward direction shown by the arrow 10b to the base end position 15a based on the signal from the base end sensor 15 while counting the number of elapsed times S2 of the control unit time Bc required for the focus lens 11 to return to the base end position 15a (step S113).

Then, the microcomputer unit 24 is operated to calculate, as the amount of adjustment, a forward and backward time ratio R between a time required for forward movement and a time required for backward movement by dividing S2 counted in the step S113 by S1 (step S114), and store the forward and backward time ratio R thus calculated m in the RAM 26 (step S115), to end the preprocessing mode.

A vertical blanking time of a video signal indicate an interval intervening between the end of the last line of one frame or field of the video signal and the beginning of the next. After the end of the preprocessing mode, as shown in FIG. 5, the microcomputer unit 24 is operated to start, in a first vertical blanking time, the movement controlling mode of adjusting a supply time for which the power is supplied to the piezoelectric element 13a and controlling power supply to the piezoelectric element 13a based on the amount of adjustment and the moving direction of the moving unit 13c (step S102). This means that the microcomputer unit 24 is operated to repeatedly move the focus lens every time after comparing the focal evaluation value currently received with the focal evaluation value previously received, and determining the moving direction and the travel distance of the focus lens 11 based on the amount of difference and a fluctuation range between the focal evaluation values, to have the focus lens 11 converged toward a position in the vicinity of a (peak) point where the focal evaluation value reaches the maximum.

Figure 7:
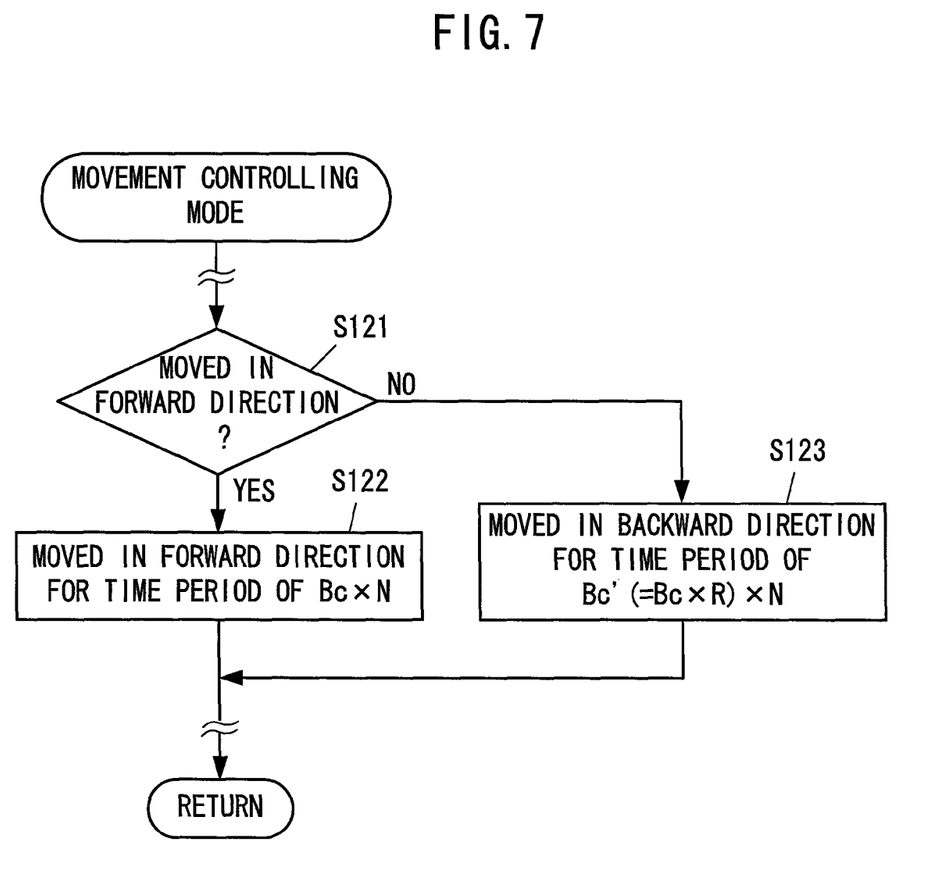
FIG. 7 is a flowchart showing processes in a movement controlling mode of the processes shown in FIG. 5.

When the microcomputer unit 24 is required to move the focus lens 11 for a time period equal to N times as long as the control unit time, in the movement controlling mode, the microcomputer unit 24 is operated to judge whether to move the focus lens 11 in the forward direction of the focus lens 11, viz., the forward direction shown by the arrow 10a (step S121) and to move the focus lens 11 in the forward direction of the focus lens 11, viz., the forward direction shown by the arrow 10a for the time period equal to N times as long as the control unit time Bc (step S122) when it is judged in the step S121 that the focus lens 11 is to be moved in the forward direction shown by the arrow 10a, as shown in FIG. 7. When, on the other hand, it is judged in the step S121 that the focus lens 11 is not to be moved in the forward direction shown by the arrow 10a, the microcomputer unit 24 is operated to move the focus lens 11 in the backward direction of the focus lens 11, viz., the backward direction shown by the arrow 10b for the time period equal to N times as long as the control unit time Bc', which is multiplication of the control unit time Bc by the forward and backward time ratio R (step S123).

Here, it is preferable to make the travel distance traveled by the focus lens 11 in the step S112 long for the purpose of reducing rounding off errors during the computation. If, however, the travel distance in the step S112 is made longer than necessary, time (preprocessing time) required for the microcomputer unit 24 to start the movement controlling mode after receiving the instruction of starting the automatic focus function is increased. In the automatic focus function employing the video contrast way, the movements of the focus lens 11 and the focal evaluation values are repeatedly detected and read every one field or one frame. The travel distance in the step S112 may be determined in such a way that the preprocessing time will end within one field or one frame, for the purpose of preventing the processing time required for the whole automatic focus operation from being changed. This means that in the automatic focus camera unit 10, S1 in the step S112 may be determined in such a way that the preprocessing time will end within, for example, one third frame.

In the automatic focus camera unit 10, if the control unit times are adjusted in the movement controlling mode for respective cases that the moving unit 13c is moved in the forward direction shown by the arrow 10a and that the moving unit 13c is moved in the backward direction shown by the arrow 10b, actual travel distances actually traveled by the moving unit 13c for the respective cases that the moving unit 13c is moved in the forward direction shown by the arrow 10a and that the moving unit 13c is moved in the backward direction shown by the arrow 10b become substantially equal to their target values, and thus, the number of times the moving unit 13c moved before reaching the focused focal point becomes substantially equal to its theoretical values. In the automatic focus camera unit 10, if, the other hand, the switching means 18a switches to the non-control unit time adjustment operation of not adjusting the control unit time in the movement controlling mode, and if the actual travel distances actually traveled by the moving unit 13c for the respective cases that the moving unit 13c is moved in the forward direction shown by the arrow 10a and that the moving unit 13c is moved in the backward direction shown by the arrow 10b are different from their target values, the number of times the moving unit 13c moved before reaching the focused focal point become increased far more than its theoretical value. If, for example, the switching means 18a switches to the non-control unit time adjustment operation of not adjusting the control unit time in the movement controlling mode, and if the actual travel distances actually traveled by the moving unit 13c for the respective cases that the moving unit 13c is moved in the forward direction shown by the arrow 10a and that the moving unit 13c is moved in the backward direction shown by the arrow 10b are different from their target values by 10%, it takes approximately 2 seconds to complete the automatic focus function. If, on the other hand, the switching means 18a switches to the control unit time adjustment operation of adjusting the control unit times in the movement controlling mode for respective cases that the moving unit 13c is moved in the forward direction shown by the arrow 10a and that the moving unit 13c is moved in the backward direction shown by the arrow 10b, the automatic focus function can be completed in approximately 1.5 seconds.

As will be appreciated from the foregoing description, it will be understood that the automatic focus camera unit 10 can carry out the automatic focus function with accuracy comparable with the conventional one, while eliminating the need of an accurate position detecting unit such as, for example, an encoder for sequentially detecting an actual position of the moving unit 13c, resulting from the fact that the automatic focus camera unit 10 is adapted to adjust the variations of the travel distances each time when the automatic focus function starts even though the travel distances actually traveled by the moving unit 13c for the respective cases that the moving unit 13c is moved in the forward direction shown by the arrow 10a and that the moving unit 13c is moved in the backward direction shown by the arrow 10b may vary due to changes of the position of the automatic focus camera unit 10 itself, the individual variability of the impact type actuator 13, and/or the change of environment such as, for example, temperature, humidity, and the like. The fact that the need of the accurate position detecting unit for sequentially detecting an actual position of the moving unit 13c leads to the fact that the automatic focus camera unit 10 can be reduced in the number of complete parts in comparison with the conventional driving apparatus, thereby realizing reductions in weight, size, and manufacturing costs.

While it has been described in the present embodiment that the automatic focus camera unit 10 is adapted to reduce a difference between the travel distances actually traveled by the moving unit 13c for the respective cases that the moving unit 13c is moved in the forward direction shown by the arrow 10a and that the moving unit 13c is moved in the backward direction shown by the arrow 10b in such a way that the moving unit 13c is moved in the forward direction shown by the arrow 10a for a time period determined based on the control unit time Bc, and the moving unit 13c is moved in the backward direction shown by the arrow 10b for a time period determined based on the control unit time Bc', which is multiplication of the control unit time Bc by the forward and backward time ratio R, which is equal to S2/S1 (S2 divided by S1), according to the present invention, the difference between the travel distances actually traveled by the moving unit 13c for the respective cases that the moving unit 13c is moved in the forward direction shown by the arrow 10a and that the moving unit 13c is moved in the backward direction shown by the arrow 10b may be reduced in another way. This means that the difference between the travel distances actually traveled by the moving unit 13c for the respective cases that the moving unit 13c is moved in the forward direction shown by the arrow 10a and that the moving unit 13c is moved in the backward direction shown by the arrow 10b may be reduced, for example, in such a way that the moving unit 13c is moved in the forward direction shown by the arrow 10a for a time period determined based on a control unit time equal to multiplication of the control unit time Bc by the S1/S2, (S1 divided by S2) and the moving unit 13c is moved in the backward direction shown by the arrow 10b for a time period determined based on the control unit time Bc. In addition, the difference between the travel distances actually traveled by the moving unit 13c for the respective cases that the moving unit 13c is moved in the forward direction shown by the arrow 10a and that the moving unit 13c is moved in the backward direction shown by the arrow 10b may be reduced, for example, in such a way that the automatic focus camera unit 10 is adjusted based on a travel time, instead of the aforementioned control unit time, taken for the moving unit 13c to travel a travel distance calculated based on the control unit time Bc.

Further, while it has been described in the above that, in the automatic focus camera unit 10, the amount of adjustment is calculated based on the base end position 15a, according to the present invention, the amount of adjustment may be calculated based on, for example, the leading end position 16a.

Further, while it has been described in the above that, in the automatic focus camera unit 10, the focus lens is constituted by the whole lens system, the focus lens may be divided into a fixed lens unit composed of one or more lenses and a movable lens unit composed of one or more lenses and the movable lens unit may be moved with respect to the fixed lens unit to have the focus adjusted.

Second Preferred Embodiment

The construction of a second preferred embodiment of an imaging apparatus according to the present invention will be described hereinlater.

The constitutional elements of the present embodiment of the imaging apparatus according to the present invention constituted by an automatic focus camera unit are the same as those of the first embodiment of the automatic focus camera unit 10 according to the present invention (see FIG. 1), and therefore, will not be described but bear the same reference numerals and legends as those of the first embodiment of the automatic focus camera unit 10.

The ROM 25 is designed to have stored therein the distance L between the base end position 15a and the leading end position 16a as mechanical dimension data.

The description hereinlater will be directed to the operation of the present embodiment of the automatic focus camera unit after the microcomputer unit 24 receives an instruction of starting an automatic focus function.

Figure 8:
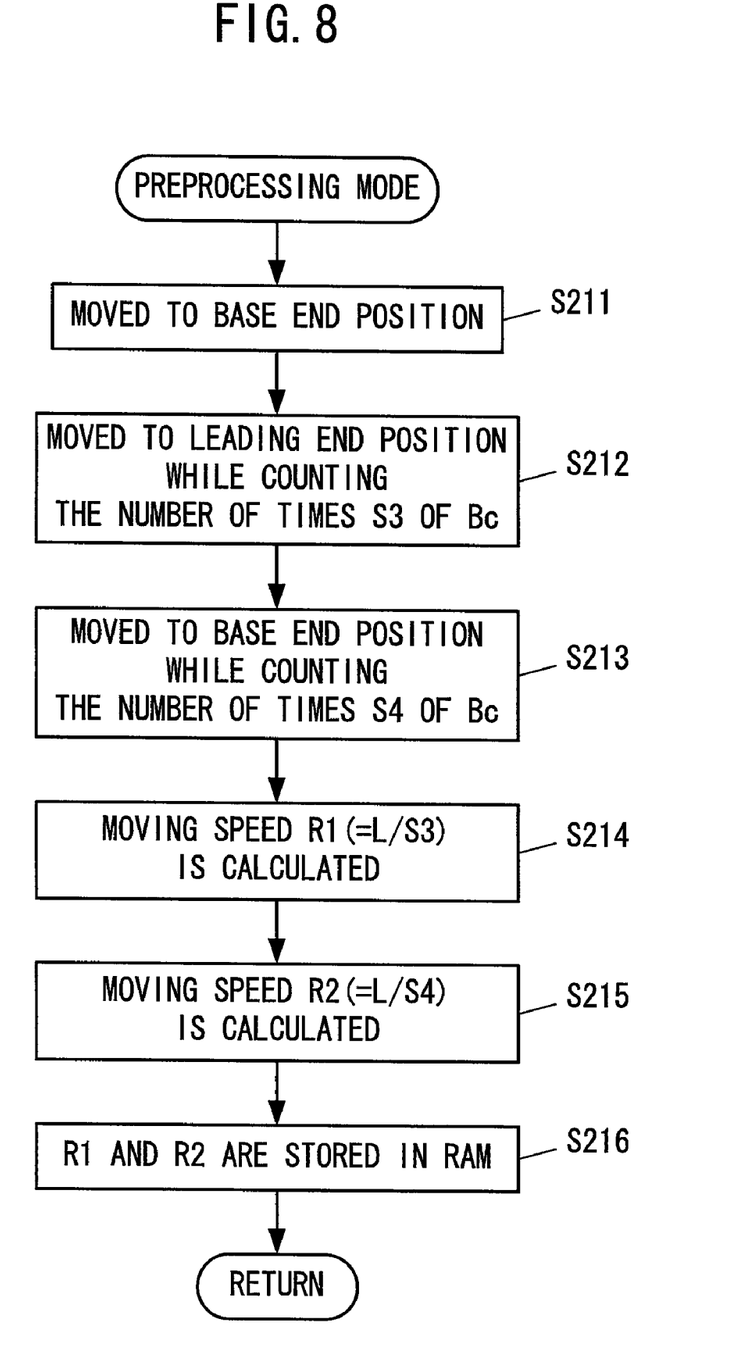
FIG. 8 is a flowchart showing processes in a preprocessing mode carried out by a second preferred embodiment of an automatic focus camera unit according to the present invention executing an automatic focus function.

As shown in FIG. 8, the microcomputer unit 24 is operated to start the preprocessing mode upon receiving the instruction of starting the automatic focus function. This means that the microcomputer unit 24 is operated to move the focus lens 11 to the base end position 15a based on a signal from the base end sensor 15 (step S211), and move the focus lens 11 from the base end position 15a to the leading end position 16a based on a signal from the leading end sensor 16 while counting the number of elapsed times S3 of the control unit time Bc required for the focus lens 11 to reach to the leading end position 16a (step S212). Then, the microcomputer unit 24 is operated to move the focus lens 11 from the leading end position 16a to the base end position 15a based on the signal from the base end sensor 15 while counting the number of elapsed times S4 of the control unit time Bc required for the focus lens 11 to return to the base end position 15a (step S213).

Then, the microcomputer unit 24 is operated to divide the distance L by S3 to calculate a moving speed R1 to be used as the amount of adjustment (step S214), divide the distance L by S4 to calculate a moving speed R2 to be used as the amount of adjustment (step S215), and store the moving speed R1 calculated in the step S214 and the moving speed R2 calculated in the step S215 in the RAM 26 (step S216), to end the preprocessing mode.

Figure 9:
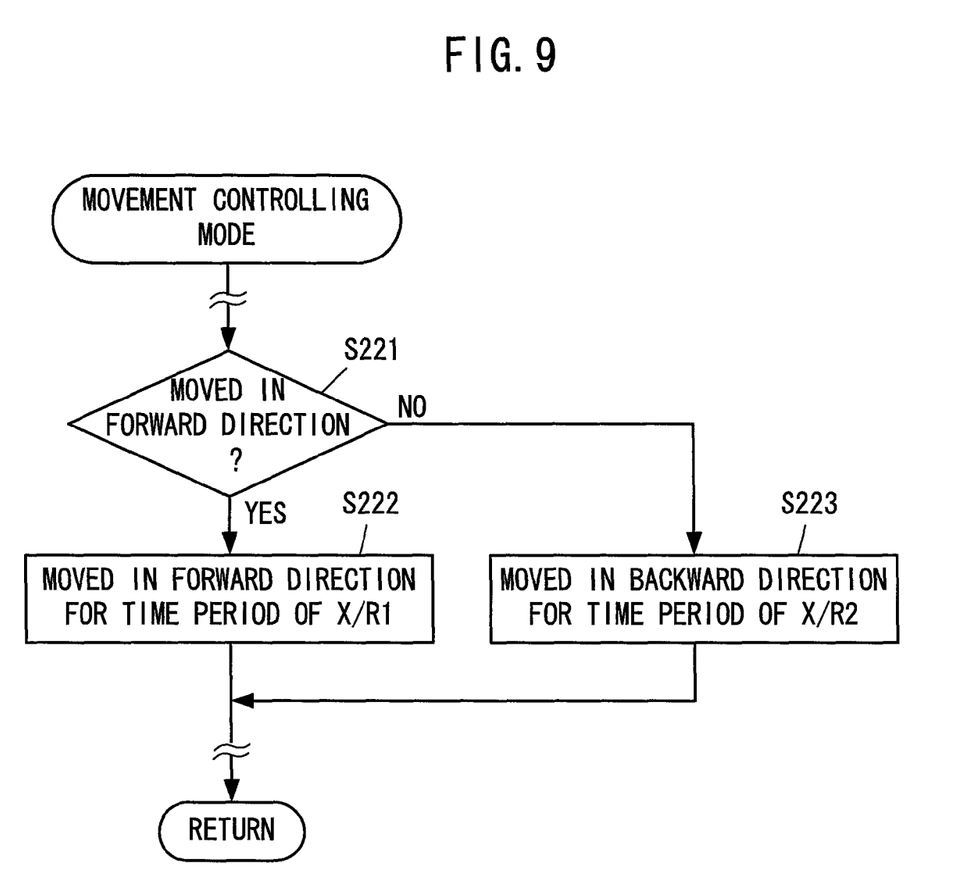
FIG. 9 is a flowchart showing processes in a movement controlling mode carried out by the second preferred embodiment of the automatic focus camera unit according to the present invention executing the automatic focus function.

Upon a first vertical blanking time after the end of the preprocessing mode, the microcomputer unit 24 is operated to start the movement controlling mode. In the case that the focus lens 11 is to travel, for example, a distance X, the microcomputer unit 24 is operated to judge whether to move the focus lens 11 in the forward direction of the focus lens 11, viz., the forward direction shown by the arrow 10a (step S221) and to move the focus lens 11 in the forward direction of the focus lens 11, viz., the forward direction shown by the arrow 10a for the time period calculated as a result of dividing the distance X by the moving speed R1 stored in the RAM 26 in the step S216 (step S222) when it is judged in the step S221 that the focus lens 11 is to be moved in the forward direction shown by the arrow 10a, as shown in FIG. 9. When, on the other hand, it is judged in the step S221 that the focus lens 11 is not to be moved in the forward direction shown by the arrow 10a, the microcomputer unit 24 is operated to move the focus lens 11 in the backward direction of the focus lens 11, viz., the backward direction shown by the arrow 10b for the time period calculated as a result of dividing the distance X by the moving speed R2 stored in the RAM 26 in the step S216 (step S223).

As will be appreciated from the foregoing description, it will be understood that the present embodiment of the automatic focus camera unit can carry out the automatic focus function with accuracy in comparison with the first embodiment of the automatic focus camera unit 10 (see FIG. 1), resulting from the fact that the present embodiment of the automatic focus camera unit can calculate the moving speed of the moving unit 13c, and thus any position placed at a travel distance from the base end position 15a or the leading end position 16a can be arbitrarily specified.

INDUSTRIAL APPLICABILITY OF THE PRESENT INVENTION

As will be seen from the foregoing description, the driving apparatus according to the present invention has an effect of being reduced in the number of complete parts in comparison with the conventional art, and is available as, for example, a driving apparatus used to drive a lens for the purpose of focus adjustment or the like.

What is claimed is:

1. A driving apparatus, comprising:
a piezoelectric element;
a driving unit to be driven by said piezoelectric element;
a moving unit to be moved with respect to said driving unit by a friction force caused by said driving unit;
predetermined position detecting means for detecting that said moving unit is placed at a predetermined position;
supply controlling means for controlling power supply to said piezoelectric element; and
second position detecting means for detecting that said moving unit is placed at a second position spaced apart from said predetermined position at a predetermined distance, and in which
said supply controlling means assumes a preprocessing mode of controlling power supply to said piezoelectric element to have said moving unit moved forwardly and backwardly based on said predetermined position detected by said predetermined position detecting means, and a movement controlling mode of adjusting a supply time for which said power is supplied to said piezoelectric element and controlling power supply to said piezoelectric element to have said moving unit moved, based on a supply time for which said power is supplied to said piezoelectric element while said moving unit is moved forwardly, a supply time for which said power is supplied to said piezoelectric element while said moving unit is moved backwardly, and a moving direction of said moving unit,
said supply controlling means is operative to control power supply to have said moving unit moved forwardly and backwardly between said predetermined position and said second position based on a result of said predetermined position detecting means and a result of said second position detecting means on said preprocessing mode.

2. A driving apparatus as set forth in claim 1, in which said supply controlling means is operative to adjust said supply time and control power supply based on said supply time for which said power is supplied to said piezoelectric element while said moving unit is moved forwardly, said supply time for which said power is supplied to said piezoelectric element while said moving unit is moved backwardly, said predetermined distance, and said moving direction on said movement controlling mode.

3. An imaging apparatus comprising:
a driving apparatus as set forth in claim 1; and
a lens supported by said moving unit.

4. A driving apparatus comprising:
a piezoelectric element;
a driving unit to be driven by said piezoelectric element;
a moving unit to be moved with respect to said driving unit by a friction force caused by said driving unit;
position detecting means for detecting that said moving unit is placed at a base end position; and
supply controlling means for controlling power supply to said piezoelectric element, in which
said position detecting means includes a shielding plate of said moving unit, and a photointerrupter for detecting that light is shielded by said shielding plate, and
said supply controlling means assumes a preprocessing mode of controlling power supply to said piezoelectric element to have said moving unit moved forwardly and backwardly based on said base end position detected by said position detecting means, and a movement controlling mode of adjusting a supply time for which said power is supplied to said piezoelectric element and controlling power supply to said piezoelectric element to have said moving unit moved, based on a supply time for which said power is supplied to said piezoelectric element while said moving unit is moved forwardly, a supply time for which said power is supplied to said piezoelectric element while said moving unit is moved backwardly, and a moving direction of said moving unit.

* * * * *